US006821662B1

United States Patent
Charlat et al.

(10) Patent No.: US 6,821,662 B1
(45) Date of Patent: Nov. 23, 2004

(54) METHOD AND DEVICE FOR RECOVERING WATER PRODUCED BY A FUEL CELL

(75) Inventors: Pierre Charlat, Lans en Vercors (FR); Gérard Boudiere, Labuisse (FR)

(73) Assignee: L'Air Liquide - Societe Anonyme a Directoire et Conseil de Surveillance pour l'Etude et l'Exploitation des Procedes Georges Claude, Paris Cedex (FR)

( * ) Notice: Subject to any disclaimer, the term of this patent is extended or adjusted under 35 U.S.C. 154(b) by 185 days.

(21) Appl. No.: 10/129,487

(22) PCT Filed: Nov. 12, 2001

(86) PCT No.: PCT/FR01/03516

§ 371 (c)(1),
(2), (4) Date: Aug. 20, 2002

(87) PCT Pub. No.: WO02/41427

PCT Pub. Date: May 23, 2002

(30) Foreign Application Priority Data

Nov. 14, 2000 (FR) .............................. 00 14652

(51) Int. Cl.$^7$ ................................. H01M 8/04
(52) U.S. Cl. ................. 429/17; 429/13; 429/19
(58) Field of Search .............................. 429/13, 17, 19

(56) References Cited

U.S. PATENT DOCUMENTS

| | | | |
|---|---|---|---|
| 5,064,732 A | 11/1991 | Meyer | |
| 5,250,091 A | 10/1993 | Nigsch et al. | |
| 5,346,778 A | 9/1994 | Ewan et al. | |
| 5,981,096 A | * 11/1999 | Hornburg et al. | ............. 429/17 |

FOREIGN PATENT DOCUMENTS

| | | |
|---|---|---|
| EP | 0 426 955 | 5/1991 |
| EP | 1 030 396 | 8/2000 |
| JP | 08 195215 | 7/1996 |
| JP | 09 019678 | 1/1997 |

OTHER PUBLICATIONS

D. Staschewski, "Internal humidifying of pem fuel cells", International Journal of Hydrogen Energy, GB, Elsevier Science Publishers B.V., Barking, vol. 21, No. 5, May 1, 1996, pp 381–385.

* cited by examiner

*Primary Examiner*—Dah-Wei Yuan
(74) *Attorney, Agent, or Firm*—Young & Thompson

(57) ABSTRACT

The device comprises two separators (20, 30) in series in the outlet portion of the hydrogen circuit each defining at least one inlet chamber (21, 31) separated, by a hydrophilic filter (22, 32), from an outlet chamber (23, 33) connected to the hydric circuit (24) of the cell.

Application to air-hydrogen fuel cells.

5 Claims, 2 Drawing Sheets

METHOD AND DEVICE FOR RECOVERING WATER PRODUCED BY A FUEL CELL

The invention relates to the field of fuel cells, more particularly of the air or oxygen and hydrogen type, and more specifically the problem of recovering the water produced by the operation of the cell.

A fuel cell of the above type, formed of at least one element, comprises a cathode compartment comprising an electrode and connected to a fuel supply circuit, which is to say principally air, enriched or not in oxygen. Such an element comprises a second so-called anode compartment containing an electrode which is separated from the first by a membrane for permeation and reaction by means of catalysts that the two electrodes have. Such an anode compartment is connected to a fuel circuit which is the hydrogen.

During operation, a portion of the water formed at the cathode passes through the membrane and enters the anode compartment, more particularly at the outlet of the hydrogen circuit. This outlet is also known to be traversed by the residual hydrogen, nitrogen and impurities.

The water balance of a fuel cell must be ensured such that the quantity of water evaporated by the passage of the gases into the cell will be less than the quantity of water produced by the reaction. This is the reason for which it is of interest to recover the water produced which is at the outlet of the anode compartment. However, the operation of the cell leaves the residual hydrogen in the anode compartment, this hydrogen incorporated in the water requiring the taking of certain precautions to ensure the recovery of this latter under safe conditions.

To observe these requirements, the solution generally used is completely to separate the air-oxygen and hydrogen circuits and to discharge the water produced at the anode outlet by a specific separate outlet.

The water is then lost, whilst the impurities and the nitrogen are eliminated by regular purges of the outlet of the hydrogen circuit.

This non-recovery is not favorable to a suitable hydric balance and this is the reason for which other solutions have been proposed.

One of them envisages injecting the water from the anode compartment at the outlet of the cathode compartment at the same time that a portion of the residual hydrogen mixture, nitrogen and impurities, is injected at the inlet of the cathode circuit.

In this way, the hydrogen is destroyed in contact with the catalyst of the cathode thanks to the presence of an excess of oxygen in the combustible gaseous mixture.

Such a possibility of connection is however not always available as a function of the structural technology of the cell, especially when the air inlet on the cathode side and the water inlet are separated. Moreover, the presence of liquid water at the air inlet can be the cause of disturbance of the flow within the cell. Under these circumstances, it is then necessary to emplace a complicated arrangement of several sets of phase separators in cascade, which complicates the installation of the cell, increases the cost and does not promote continued operation under optimum conditions at a desirable cost.

The object of the invention simply has for its object to overcome the above drawbacks, by providing a new process and new device permitting ensuring recovery of the water produced by the operation of a fuel cell and, more particularly, by that from the anode compartment.

To achieve the above object in the process according to the invention:

position, at the outlet of the hydrogen circuit of the anode compartment, two separators in series, each provided with at least one filter of hydrophilic nature, delimiting in the separator an inlet chamber and an outlet chamber connected to a water evacuation passage, create a pressure drop in the circuit between the two separators, provide for continuous passage of fluid from the anode compartment through the separator.

The object of the invention also is, for practicing the above process, a device for recovering the water produced by a fuel cell, of the type comprising at least one element comprised by a cathode compartment provided with an electrode and connected to a fuel supply circuit and by an anode compartment, provided with an electrode separated from the first by a membrane, and connected to a hydrogen supply circuit, characterized in that it comprises two separators disposed in series at the outlet of the hydrogen circuit, each defining at least one separate admission chamber, by a hydrophilic filter, by an outlet chamber connected to the hydric circuit of the cell, a device generating a pressure drop being interposed between the separators.

Other characteristics will appear from the description given below with reference to the accompanying drawings which show by way of non-limiting example, embodiments according to the invention.

Figure 1:
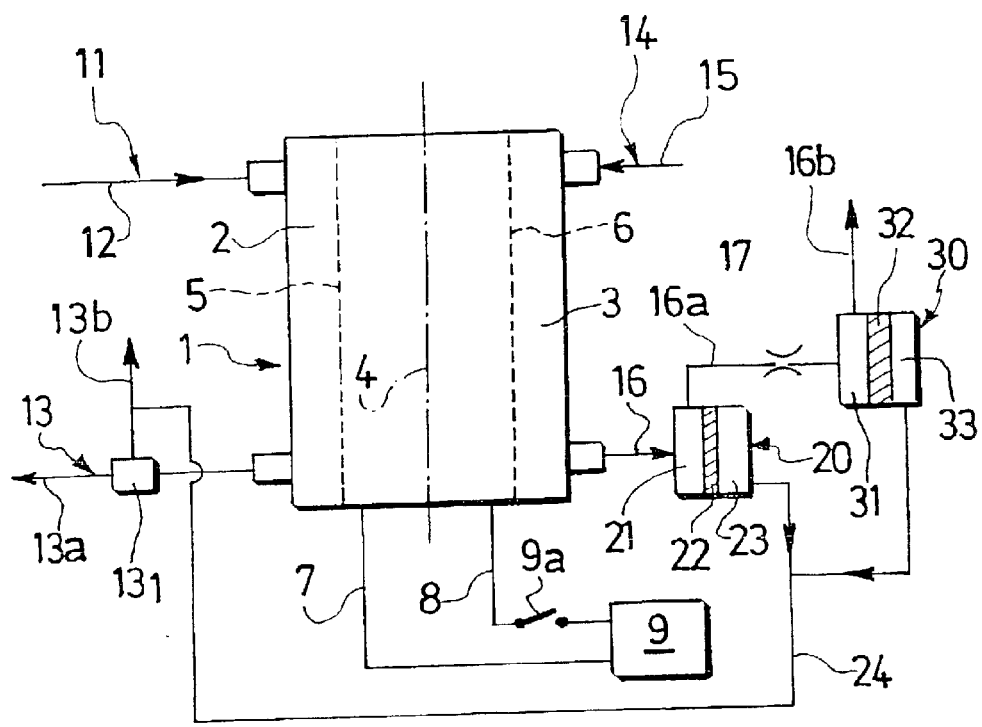
FIG. 1 shows a first embodiment of the invention.

The device for recovering the water of operating a fuel cell is illustrated in the example according to FIG. 1 with a cell constituted by a single element 1 comprising, in conventional manner, a cathode compartment 2 and an anode compartment 3 which are separated by a membrane 4. The compartments 2 and 3 contain two electrodes 5 and 6, respectively associated with a catalyst and with cathodic and anodic function.

Conventionally, the electrodes 5 and 6 are provided with two terminals 7 and 8 between which, by the operation of the fuel cell, appears a potential difference which is taken up by a load or consumption circuit 9 which can be isolated from at least one of the terminals by a switch 9a. Also conventionally, the compartment 2 is associated with a combustible supply circuit 11, preferably air, enriched or not with oxygen. Such a circuit comprises an inlet branch 12 connected to the compartment 2 and an outlet branch 13 emerging from this latter.

The outlet branch 13 is provided with a phase separator $13_1$, from which extend a first sub-branch 13a to evacuate the impurities and nitrogen toward the ambient surroundings and a sub-branch 13b for evacuating the water produced in the cathode compartment in the direction of the hydric circuit for humidifying and/or cooling the fuel cell.

In a known manner, the anode compartment 3 is associated with a hydrogen supply circuit 14, such a circuit comprising a supply or inlet branch 15 and an outlet branch 16.

So as to recover the water which is caused to circulate through the branch 16, it is provided to use the following device:

In a first embodiment, according to FIG. 1, the outlet branch 16 comprises two separators 20 and 30 in series. The first separator 20 has an inlet chamber 21 to which is connected the outlet branch 16. The inlet chamber 21 is delimited within the separator 20 by a filter 22 of the hydrophilic type, typically a cloth or felt of polyamide fibers, which separates the inlet chamber 21 from an outlet chamber 23 connected by a line or conduit 24, for example to the sub-branch 13b. The inlet chamber 21 is also provided with an outlet sub-branch 16a, provided with a restriction 17, for example a calibrated hole, opening into the inlet chamber 31 of the downstream separator 30, also provided with a hydrophilic nylon filter 32 separating the inlet chamber 31 from an outlet chamber 33 connected by a water evacuation conduit 34 to the line 24. The gaseous residue is evacuated from the chamber 31 through the conduit 16b.

With such an arrangement, the pressures in the inlet chambers 21 and 31 are different, which permits effectively separating the water from the gas even with a low upstream pressure, and considerably reducing the surfaces of the filter for a given flow rate to be treated, the pressure drop created by the water in the restriction being always substantially greater than the pressure drop created by the gas alone (in general, less than 200 mbar for an upstream pressure of about 1 bar).

By the above means, it is possible to use the process consisting in ensuring the evacuation of the mixture from the compartment 3 continuously, through the branch 16 to the inlet chamber 21 of the separator 20. The hydrophilic filters 22 and 32 permit ensuring a complete separation between the gaseous products included in the mixture, comprised at least in part of hydrogen, in the outlet branch 16 and the water which is evacuated/recycled through the conduit 24.

The purpose of the hydrophilic filters 22 and 32 is to ensure the total and complete removal of the water included in the mixture circulating in the outlet branch 16 and, in order to perform this function, it is convenient to have filters constituted of a porous hydrophilic material whose pore diameter is less than 5 microns.

Figure 2:
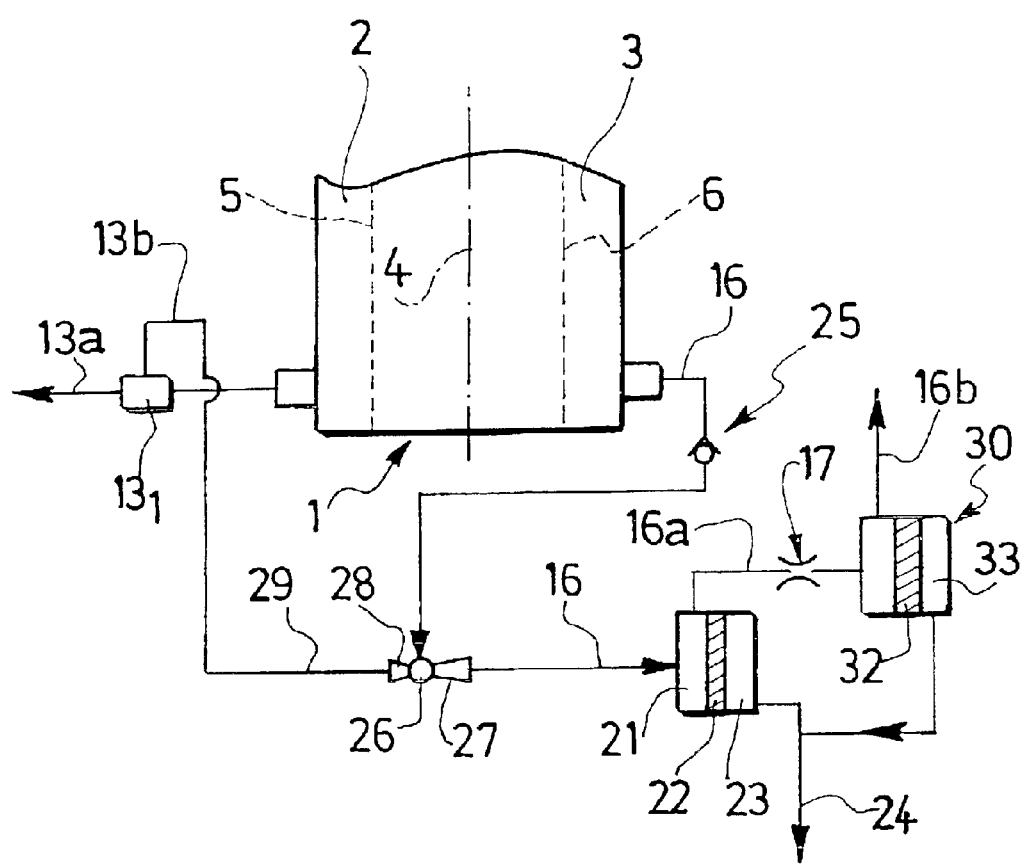
FIG. 2 is a diagram analogous to that of FIG. 1 but showing a modification of the invention.

According to a modification shown in FIG. 2, the branch 16 is connected, beyond a non-return member 25, either controlled like a valve or the like, or automatically like a non-return valve, as shown, to a pump 26 for re-establishing pressure, whose output 27 is connected to the inlet chamber 21 of the upstream separator 20. The second inlet 28 of the pump 26 is connected to a line 29 for circulation of water from for example either the cooling circuit or a cathode circuit.

The invention is not limited to the examples shown and described, because various modifications can be imparted thereto without departing from the scope of the following claims.

What is claimed is:

1. Process for recovering the water produced by a fuel cell, in which:
    there are positioned, at the outlet of the hydrogen circuit of the anode compartment, two separators in series, each provided with at least one hydrophilic filter, delimiting in the separator an inlet chamber and an outlet chamber connected to a water evacuation conduit,
    a pressure drop is created in the circuit between the two separators,
    the passage of the fluid from the anode compartment through the separator is continuously maintained.

2. Device for recovering the water produced by a fuel cell, of the type comprising at least one element comprised by a cathode compartment provided with an electrode and connected to a fuel supply circuit and an anode compartment, provided with an electrode separated from the first one by a membrane, and connected to a hydrogen supply circuit, which further comprises two separators disposed in series at the outlet of the hydrogen circuit of the anode compartment, each defining at least one inlet chamber separated by a hydrophilic filter, from an outlet chamber, a device for generating a pressure drop being interposed between the separators.

3. Device according to claim 2, wherein the outlet of the hydrogen circuit is connected to the inlet chamber of the upstream separator via a pump whose second inlet is connected to a conduit from the branch of the water outlet of a separator disposed at the outlet of the cathode compartment.

4. Device according to claim 2, wherein the diameter of the meshes of at least the filter of the upstream separator is less than 5 microns.

5. Device according to claim 2, wherein the hydrophilic filters are constituted of nylon fibers.

* * * * *